United States Patent
Chen

(10) Patent No.: US 11,573,982 B2
(45) Date of Patent: Feb. 7, 2023

(54) EFFICIENT REAL-TIME HIERARCHY USING CHANGE EVENTS

(71) Applicant: SAP SE, Walldorf (DE)

(72) Inventor: Wei Chen, Shanghai (CN)

(73) Assignee: SAP SE, Walldorf (DE)

( * ) Notice: Subject to any disclaimer, the term of this patent is extended or adjusted under 35 U.S.C. 154(b) by 185 days.

(21) Appl. No.: 17/121,364

(22) Filed: Dec. 14, 2020

(65) Prior Publication Data

US 2022/0188334 A1 Jun. 16, 2022

(51) Int. Cl.
*G06F 16/248* (2019.01)
*G06F 16/28* (2019.01)
*G06F 16/22* (2019.01)
*G06F 16/2455* (2019.01)

(52) U.S. Cl.
CPC ........ *G06F 16/282* (2019.01); *G06F 16/2246* (2019.01); *G06F 16/2282* (2019.01); *G06F 16/248* (2019.01); *G06F 16/2455* (2019.01); *G06F 16/288* (2019.01)

(58) Field of Classification Search
CPC .............. G06F 16/282; G06F 16/2246; G06F 16/2282; G06F 16/2455; G06F 16/248; G06F 16/288; G06F 16/00; G06F 16/20; G06F 16/22; G06F 16/2228; G06F 16/2291; G06F 16/23; G06F 16/2453; G06F 16/24539
See application file for complete search history.

(56) References Cited

U.S. PATENT DOCUMENTS

| | | | |
|---|---|---|---|
| 6,349,406 B1* | 2/2002 | Levine | G06F 11/3466 702/179 |
| 2006/0147117 A1* | 7/2006 | Wakeam | G06V 30/32 717/142 |
| 2009/0037514 A1* | 2/2009 | Lankford | H04L 45/00 709/201 |
| 2014/0006354 A1* | 1/2014 | Parkison | G06F 16/172 707/661 |
| 2014/0006357 A1* | 1/2014 | Davis | G06F 11/1446 707/667 |
| 2014/0136498 A1* | 5/2014 | Finis | G06F 16/2329 707/695 |
| 2019/0129893 A1* | 5/2019 | Baird, III | G06F 16/1873 |
| 2019/0130001 A1* | 5/2019 | May | G06F 16/24537 |
| 2021/0303528 A1* | 9/2021 | Meister | G06F 16/162 |

* cited by examiner

*Primary Examiner* — Wilson Lee
(74) *Attorney, Agent, or Firm* — Schwegman Lundberg & Woessner, P.A.

(57) ABSTRACT

Techniques for providing an efficient real-time hierarchy based on change events are disclosed. In some embodiments, a computer-implemented method comprises: storing a hierarchy table comprising hierarchy data that represents a snapshot state of a hierarchy tree of entities at a first point in time and having been last updated at the first point in time; receiving one or more user requests to change entity data representing entities of the hierarchy tree; storing one or more change events in a queue based on the user request(s); receiving a query request for the hierarchy tree; in response to the receiving of the query request, generating a query result based on the hierarchy table stored in the database and the change event(s) stored in the queue; and performing a function of an enterprise application platform using the query result.

20 Claims, 12 Drawing Sheets

EFFICIENT REAL-TIME HIERARCHY USING CHANGE EVENTS

TECHNICAL FIELD

The present application relates generally to the technical field of electrical computer systems, and, in various embodiments, to systems and methods of providing an efficient real-time hierarchy based on change events.

BACKGROUND

Current solutions for managing a hierarchy of entities in a computer system suffer from technical problems. In programming, a hierarchy tree may be used to represent a hierarchy and may be persisted in a relational database. One way to persist a hierarchy tree in a relational database is by saving a pre-order (NLR) traversal result of the hierarchy tree. The saved traversal result of the hierarchy tree can be used to service query requests for data of the hierarchy tree, which improves the speed and efficiency of generating responses to the query requests, since the traversal that would be used to search the hierarchy tree has already been performed prior to servicing of the query requests. However, when a change is made to the hierarchy tree, such as the addition of a new entity to the hierarchy tree, the computer system must traverse the hierarchy tree again and save the result. It is not efficient to traverse the hierarchy tree for each change that is made. For example, a hierarchy tree for an organization may include tens of thousands of employees. If changes to the organization are frequent, the functional impact on the computer system is significant, as the computational expense and the time involved in implementing the changes are high. In some solutions, the hierarchy tree is periodically traversed and saved to a database. However, since the updates in these solutions are periodic with gaps between them, the changes to the hierarchy tree are not reflected in real-time. Users that depend on the changes being implemented in the hierarchy tree must wait until the hierarchy tree is completed refreshed. As a result, the underlying computer system fails to reliably reflect changes made to a hierarchy tree in real-time. In addition to the issues discussed above, other technical problems may arise as well.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
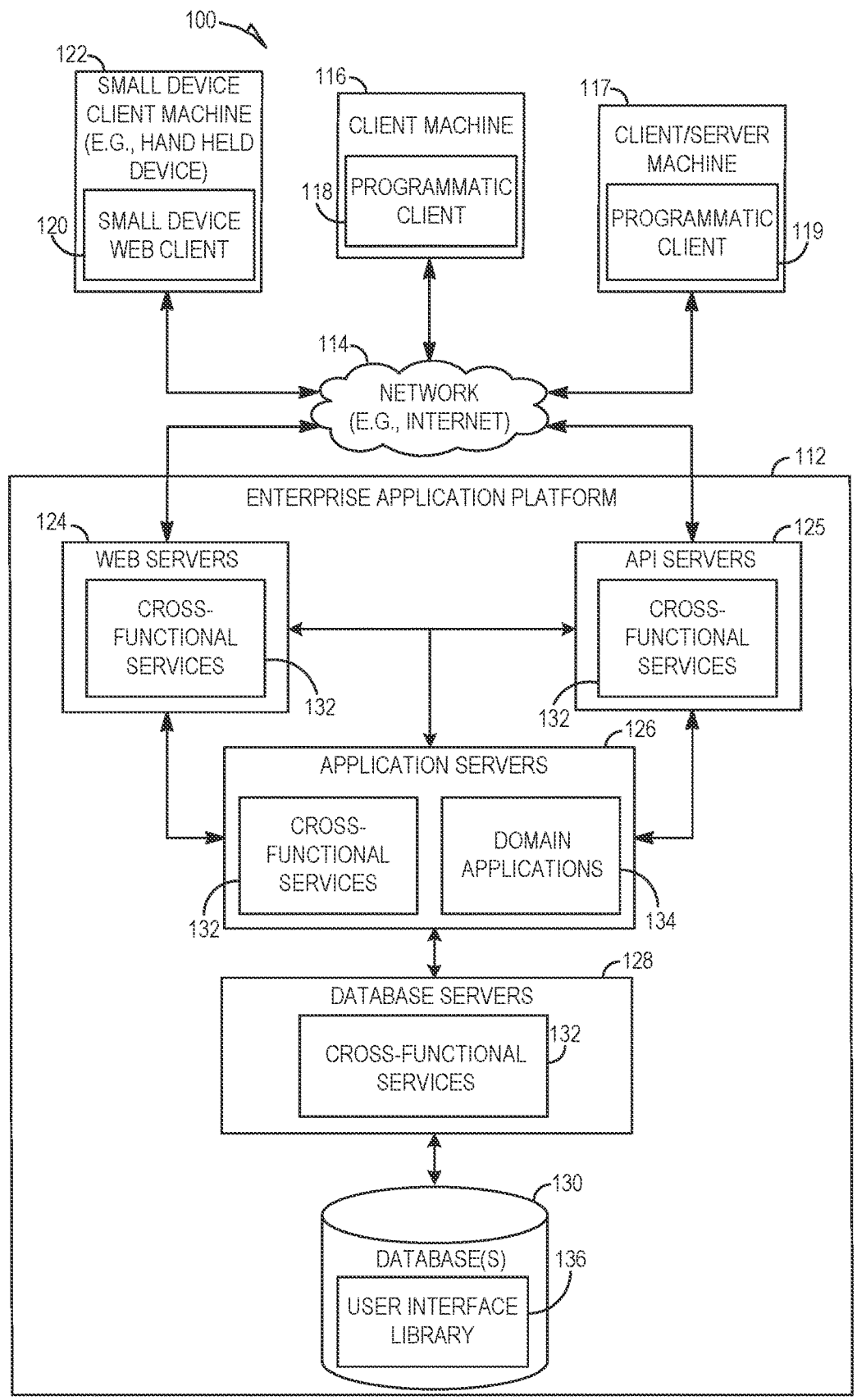
FIG. 1 is a network diagram illustrating a system, in accordance with some example embodiments.

Example methods and systems for providing an efficient real-time hierarchy based on change events are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to provide a computer system that is specially-configured to provide an efficient real-time hierarchy based on change events. In some example embodiments, a computer system is configured to generate a query result in response to a query request for a hierarchy tree based on a combination of a first hierarchy table representing a snapshot state of the hierarchy tree at a first point in time and one or more change events corresponding to one or more requested changes that occurred after the first point in time. The computer system may also be configured to use the one or more change events to update a second hierarchy table that is temporarily not being used for generating any query results for end users while the first hierarchy table is being used to generate query results for end users, and then switch the roles of the hierarchy tables, such that the second hierarchy table is used to generate query results and the first hierarchy table is updated based on additional change events.

By using a combination of a hierarchy table representing a snapshot state of a hierarchy tree at a first point in time and the change events corresponding to requested changes that occurred after the first point in time to generate a query result, the computer system can efficiently perform functions using a real-time representation of the hierarchy tree without incurring the computational expense associated with constantly updating the hierarchy table every time a requested change occurs. As a result, the functionality of the computer system is improved. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is a network diagram illustrating a system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
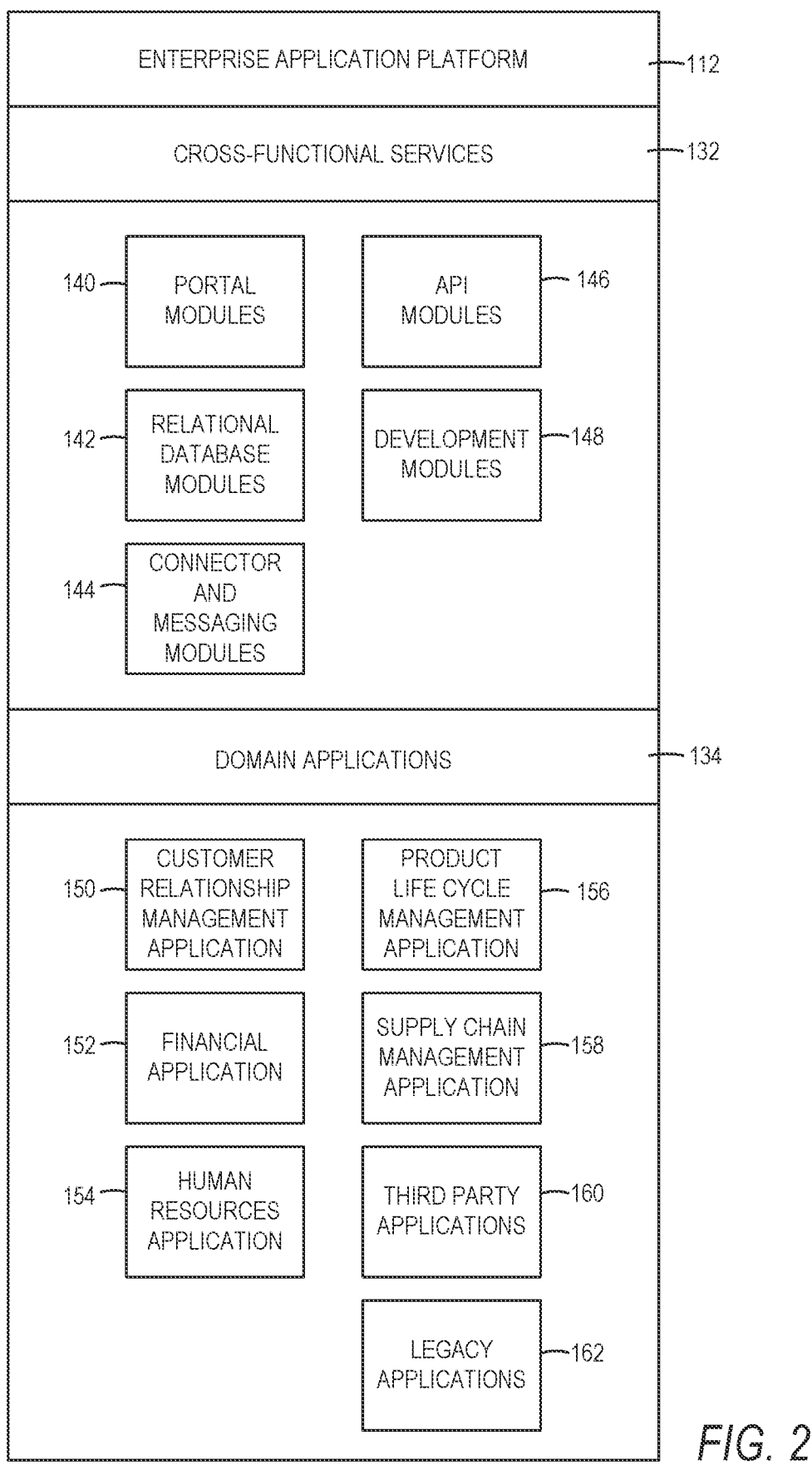
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, database modules 142 (e.g., relational database modules), connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ABAP®) and Web Dynpro, XML, JCA, JAAS, X.509, LDAP, WSDL, WSRR, SOAP, UDDI and MICROSOFT®.NET®.

The database modules 142 can provide support services for access to the database(s) 130, which includes a user interface library 136. The database modules 142 can provide support for object relational mapping, database independence, and distributed computing. The database modules 142 can be utilized to add, delete, update, and manage database elements. In addition, the database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, a customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

Human resource applications 154 can be utilized by enterprise personnel and business processes to manage, deploy, and track enterprise personnel. Specifically, the human resource applications 154 can enable the analysis of human resource issues and facilitate human resource decisions based on real-time information.

Product life cycle management applications 156 can enable the management of a product throughout the life cycle of the product. For example, the product life cycle management applications 156 can enable collaborative engineering, custom product development, project management, asset management, and quality management among business partners.

Supply chain management applications 158 can enable monitoring of performances that are observed in supply chains. The supply chain management applications 158 can facilitate adherence to production plans and on-time delivery of products and services.

Third-party applications 160, as well as legacy applications 162, can be integrated with domain applications 134 and utilize cross-functional services 132 on the enterprise application platform 112.

Figure 3:
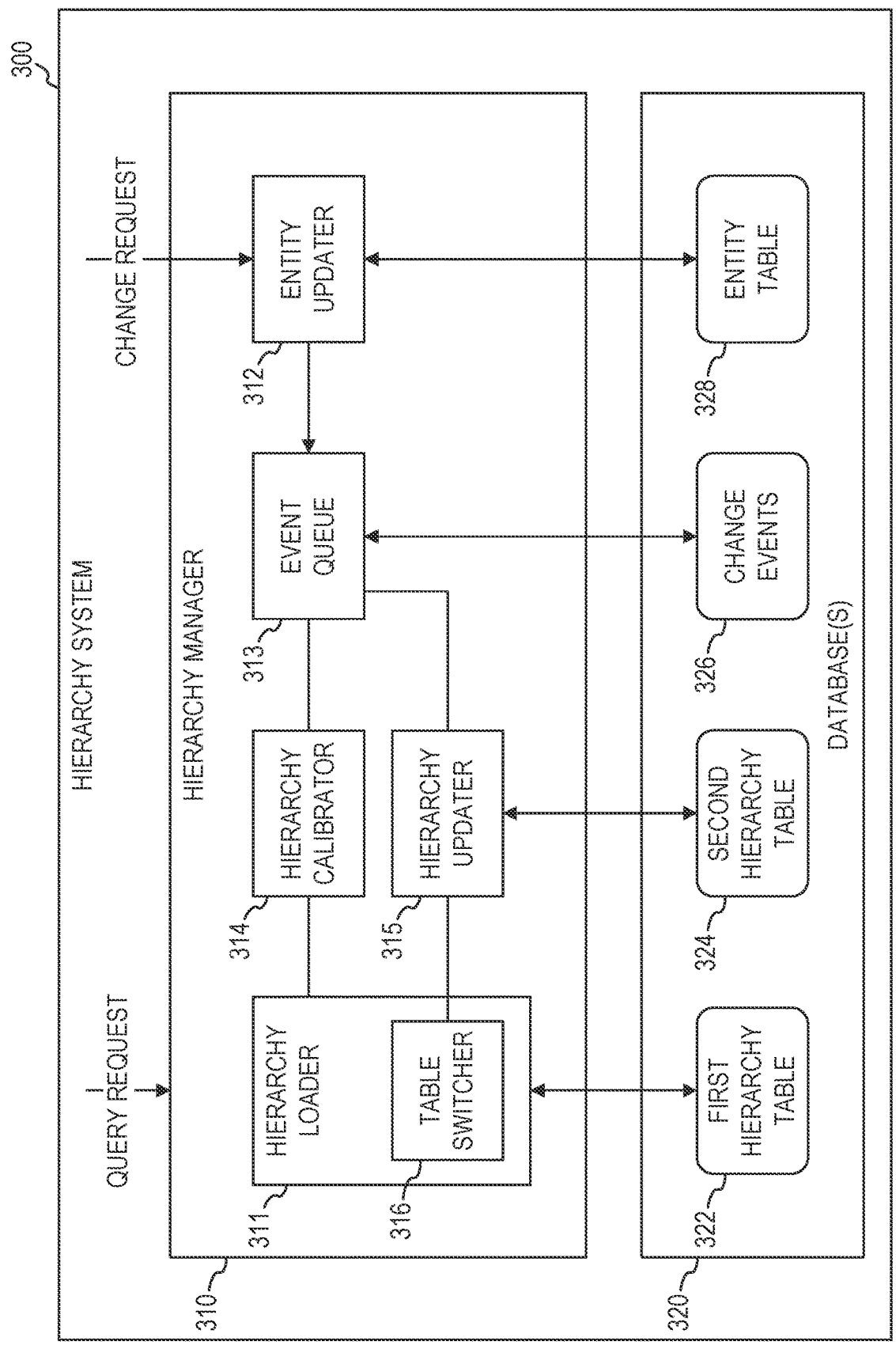
FIG. 3 is a block diagram illustrating a hierarchy system, in accordance with some example embodiments.

FIG. 3 is a block diagram illustrating a hierarchy system 300, in accordance with some example embodiments. In some embodiments, the hierarchy system 300 comprises a hierarchy manager 310 and one or more databases 320. The hierarchy manager 310 and the database(s) 320 can reside on a computer system, or other machine, having a memory and at least one processor (not shown). In some embodiments, the hierarchy manager 310 and the database(s) 320 are incorporated into the enterprise application platform 112 in FIGS. 1 and 2. However, it is contemplated that other configurations of the hierarchy manager 310 and the database(s) 320 are also within the scope of the present disclosure.

In some example embodiments, the hierarchy manager 310 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input. In some example embodiments, the hierarchy manager 310 is configured to receive user input. For example, the hierarchy manager 310 can present one or more graphical user interface (GUI) elements (e.g., drop-down menu, selectable buttons, text field) with which a user can submit input. In some example embodiments, the hierarchy manager 310 is configured to perform various communication functions to facilitate the functionality described herein, such as by communicating with a computing device (e.g., the small device client machine 122, the client machine 116, or the client/server machine 117) via the network 114 using a wired or wireless connection.

Figure 4:
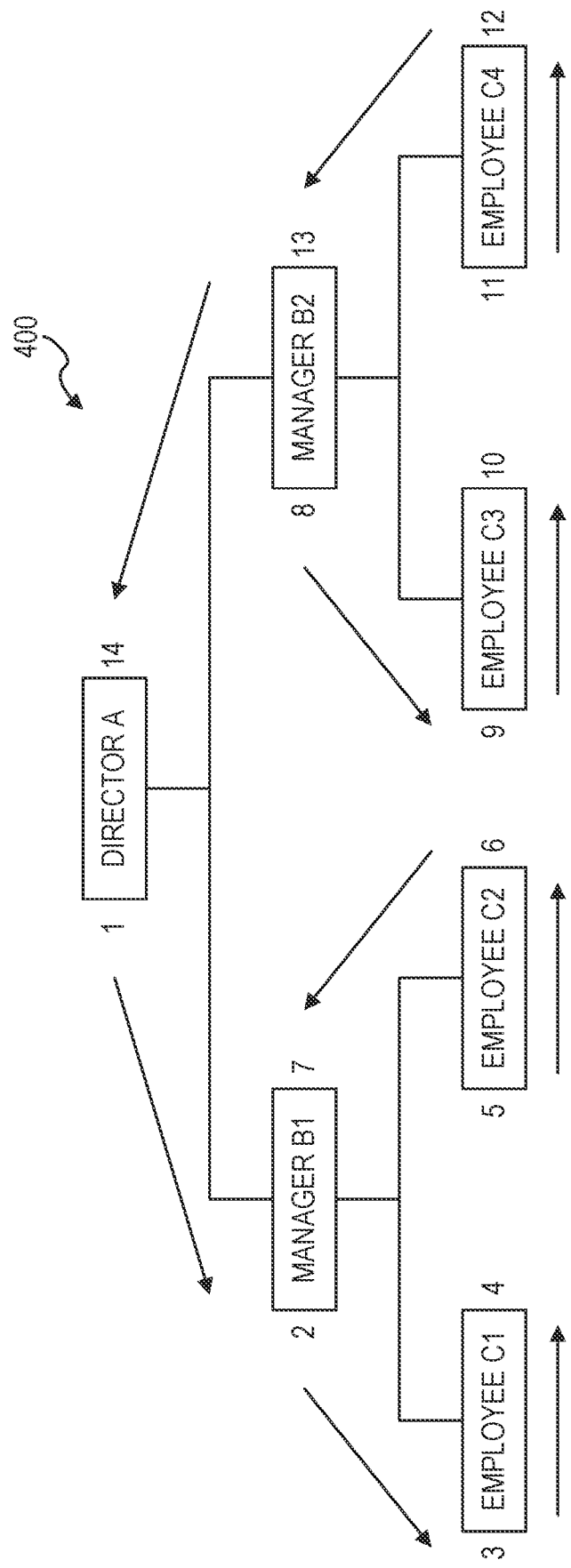
FIG. 4 illustrates a hierarchy tree, in accordance with some example embodiments.

In some example embodiments, the hierarchy system 300 is configured to provide query responses for data stored in a hierarchy tree of entities. FIG. 4 illustrates a hierarchy tree 400, in accordance with some example embodiments. In the example shown in FIG. 4, the hierarchy tree 400 comprises entities that represent members of an organization, where the entities are represented by nodes of the hierarchy tree 400. The root node of the hierarchy tree 400 is labeled "DIRECTOR A" and represents a director within the organization. The root node has two children nodes labeled respectively "MANAGER B1" and "MANAGER B2" that represent managers within the organization. The "MANAGER B1" node has two children nodes labeled respectively "EMPLOYEE C1," and "EMPLOYEE C2" that represent employees that are one level below the "MANAGER B1"

node. The "MANAGER B2" node has two children nodes labeled respectively "EMPLOYEE C3" and "EMPLOYEE C4" that represent employees that are one level below the "MANAGER B2" node. Although the entities of the hierarchy tree 400 comprise members of an organization, other types of entities are also within the scope of the present disclosure, including, but not limited to, products or other tangible assets of a company.

Referring back to FIG. 3, in some example embodiments, the hierarchy manager 310 is configured to receive a query request for information from the hierarchy tree 400, and then generate a query result in response to the query request. For example, a user of the enterprise application platform 112 within which the hierarchy system 300 may be implemented may submit a query request for a list of all members of the organization that work under DIRECTOR A, such as a query request submitted via selection of one or more user interface elements on a computing device of the user, and the hierarchy manager 310 may generate and provide a query result comprising the requested list of members to the user. Other types of query requests are also within the scope of the present disclosure.

In some example embodiments, the hierarchy system 300 stores a first hierarchy table 322 in the database(s) 320. The first hierarchy table 322 may comprise first hierarchy data that represents a snapshot state of a hierarchy tree of entities, such as the hierarchy tree 400, at a first point in time, where the first hierarchy table 322 was last updated at the first point in time. In some example embodiments, the first hierarchy table 322 comprises a result of a pre-order (NLR) traversal of the hierarchy tree 400 at the first point in time. Alternatively, the first hierarchy table 322 may comprise another type of traversal result of the hierarchy tree 400, including, but not limited to, an in-order (LNR) traversal result, a reverse in-order (RNL) traversal result, or a post-order (LRN) traversal result. Furthermore, the hierarchy tree of entities may comprise any type of hierarchy tree, including, but not limited to, a binary tree whose nodes have at most two children or a multiway tree whose nodes may have more than two children.

Additionally, in generating a traversal result for a multiway tree, the hierarchy system 300 may employ a similar procedure as for a binary tree. For example, the hierarchy system 300 may use an NLR traversal for a multiway tree in a similar way as for a binary tree: accessing the data part of the current node, then traversing the left subtree by recursively calling the pre-order function, and then traversing the neighboring right subtree by recursively calling the pre-order function, thereby traversing its way through the tree from the left-most subtree to the right-most subtree.

The following table (Table 1) shows an NLR traversal order of the hierarchy tree 400 shown in FIG. 4:

| ORDER | NODE | NODE ID |
| --- | --- | --- |
| 1 | Director A | DA1 |
| 2 | Manager B1 | MB1 |
| 3 | Employee C1 | EC1 |
| 4 | Employee C2 | EC2 |
| 5 | Manager B2 | MB2 |
| 6 | Employee C3 | EC3 |
| 7 | Employee C4 | EC4 |

As a result of the NLR traversal, the hierarchy system 300 may save a representation of the hierarchy tree 400 with the first hierarchy table 322. The following table (Table 2) is one example of the first hierarchy table 322 based on the example NLR traversal order of the hierarch tree 400 shown above:

| Node ID | Left Number | Right Number | Level | Type |
| --- | --- | --- | --- | --- |
| DA1 | 1 | 14 | 0 | Available |
| MB1 | 2 | 7 | 1 | Available |
| EC1 | 3 | 4 | 2 | Available |
| EC2 | 5 | 6 | 2 | Available |
| MB2 | 8 | 13 | 1 | Available |
| EC3 | 9 | 10 | 2 | Available |
| EC4 | 11 | 12 | 2 | Available |

In the example first hierarchy table 322 above, the "Node ID" is an identification for the corresponding entity node, the "Left Number" is the number of traversal steps before entering the corresponding subtree of the corresponding entity node, the "Right Number" is the number of traversal steps before leaving the corresponding subtree of the corresponding entity node, the "Level" is the number of edges between the corresponding entity node and the root entity node (e.g., the root entity node is DA1 in the example above). For each entity node in the hierarchy tree 400, its descendants have their left and right numbers between the entity node's numbers, independently of their depth level. The first hierarchy table 322 may also have a corresponding "Type" for each node, which indicates whether the corresponding entity is no longer part of the hierarchy tree 400 but still has descendants in the hierarchy tree 400. In one example in which the hierarchy tree 400 comprises members of a company, the type value for each node may be either "Available" or "Vacant," where "Available" means that the member corresponding to the node is currently within the organization, and "Vacant" means that the member corresponding to the node has left the organization, but that one or more other members of the organization that were reporting to the member that left (e.g., descendants of the member) are still within the organization in the same position. Other configurations of the first hierarchy table 322 are also within the scope of the present disclosure, including additional columns that include additional details of the corresponding entity nodes.

In some example embodiments, the hierarchy system 300 stores entity data in a data storage structure, such as an entity table 328 stored in the database(s) 320. The entity data comprises data for each entity, such as data for each member of an organization. Examples of entity data include, but are not limited to, a name or other identification (e.g., an identification number) of a member of an organization, a role, job title or position within the organization, employment contact information (e.g., office address, phone number, email address, etc.), personal contact information (e.g., a home address), an identification of another member to whom the member reports, an identification of one or more other members who report to the member, and other information of the member (e.g., any other employment data of the member, such as performance data and date employment began at organization).

In some example embodiments, the overall system receives user requests to change organizational data (e.g., which nodes are added or removed, and which nodes are children nodes of which parent nodes) stored in the hierarchy tree structure. Examples, as will be described later, include adding entities, removing entities, or reassigning entities within the hierarchy tree structure. When such changes are made, the entire hierarchy tree structure can experience significant realignment requiring a subsequent query to read data from the newly realigned hierarchical tree structure to traverse a substantial, if not the entire, newly realigned hierarchical tree structure. This can be time consuming for such read requests.

The hierarchy system 300 provides faster responses to read requests by receiving such user requests to read and output organization data stored in either the first hierarchy table 322 or second hierarchy table 324, any updates as stored in change events 326, and entity data stored in the entity table 328. In some example embodiments, the hierarchy manager 310 may comprise an entity updater 312 that is configured to receive the user requests and modify the entity table 328 according to the user requests. For example, the user requests may comprise updating a work address for an employee. Other user requests may change the organization data of the hierarchy tree 400 that would then render the first hierarchy table 322 outdated in situations in which change requests are received after the point in time at which the first hierarchy table 322 was last updated. Therefore, in order to address this technical problem of not accurately reflecting changes to the organization data stored as part of a hierarchy in real-time, the hierarchy system 300 may combine the most recent snapshot state of the hierarchy tree 400 represented by the first hierarchy table 322 with the recently received changes made to the entity table 328 in order to generate an up to date response to a user request.

In some example embodiments, the hierarchy system 300 uses the first hierarchy table 322 as a baseline, and then applies the requested changes according to the scope of the query request and change events related to the query request in order to generate a real-time representation of the hierarchy tree 400 on the fly. As a result of combining the last snapshot state of the hierarchy tree 400 and the recent relevant change events, the hierarchy system 300 ensures that the response to the query request is up to date and correct. In order to decrease the number of change events to process, the hierarchy system 300 may periodically refresh the entire hierarchy to the database(s) 320.

In some example embodiments, the hierarchy system 300 uses two tables to persist the NLR traversal result. One table, such as the first hierarchy table 322, is activated as the current table to serve query requests, while the other table, such as a second hierarchy table 324, is loading a more recent version of the hierarchy tree. In this way, while the first hierarchy table 322 serves in the role as the active table available for servicing query requests and providing output data to the end user, the hierarchy system 300 may, in parallel, store the organization data from the hierarchy tree structure into the second hierarchy table 324, which serves in the role as the offline table that is not available for servicing query requests. Subsequently, the hierarchy system 300 switches the roles of the first hierarchy table 322 and the second hierarchy table 324, resulting in the second hierarchy table 324 being used to service query requests, while the first hierarchy table 322 is updated by having the hierarchy tree structure traversed to provide a more up-to-date hierarchy table to process read requests.

In some example embodiments, when the hierarchy system 300 switches the roles of the first hierarchy table 322 and the second hierarchy table 324, the hierarchy system 300 clones the data from whichever table is being switched from the role of offline table to active table to the other table that is being switched from the role of active table to offline table. For example, if the first hierarchy table 322 is acting as the active table and the second hierarchy table 324 is acting as the offline table, the hierarchy system 300 may switch the first hierarchy table 322 to act as the offline table and the second hierarchy table 324 to act as the active table, and may synchronize the first hierarchy table 322 with the second hierarchy table 324 by cloning the data from the second hierarchy table 324 to the first hierarchy table 322. By periodically switching the roles of the two hierarchy tables 322 and 324, the hierarchy system 300 the number of change events to process is maintained at a small scale, reducing the associated time expense and making the update process more efficient.

Using the example of the hierarchy table above, in some embodiments, if a user wants to query all of the members of the organization that directly report to Director A, the user would enter some form of a generic query in which an input data field would be "Director A." As the user typically does not have direct access to the either of the first or second hierarchical tables 322 and 324, nor the data stored therein, he will not have direct access to the Left and Right Numbers. Therefore, the hierarchy system 300 will convert the end user's generic data query into, as an example, the following Structured Query Language (SQL) statement:
Select*from USER_HIERARCHY_TABLE where LEFT_NUMBER>1 and RIGHT_NUMBER<14 and level<=1.

If the user wants to query all members that report, directly and indirectly, to Manager B2, an end user generic query will be converted into the following SQL statement:
Select*from USER_HIERARCHY_TABLE where LEFT_NUMBER>8 and RIGHT_NUMBER<13.

If the user wants to query all of the members that directly report to Manager B2, an end user generic query will be converted into the following SQL statement:
Select*from USER_HIERARCHY_TABLE where LEFT_NUMBER>8 and RIGHT_NUMBER<13 and level<=2.

Adopting change events to the hierarchy tree 400 may be very time consuming. For example, when a new user, such as Employee C5, is added to the hierarchy tree 400 and is configured as reporting to Manager B1, then the hierarchy tree 400 may be changed. However, even with a change event of limited scope, such as adding only a single member, several other entity node values may be required to be changed as well. For example, adding a single entity to the hierarchy tree 400 can change many Left Numbers and Right Numbers of many other entities in the hierarchy tree 400. In addition, traversing a large hierarchy tree 400 of thousands of entities can be time-consuming. Therefore, in order to improve efficiency, the hierarchy system 300 does not traverse the hierarchy tree to generate the hierarchy table for every change event. Rather, the hierarchy system 300 stores (e.g., caches) the change events and generates the query result based on the last snapshot state of the hierarchy tree 400, as represented by the active hierarchy table, and the stored change events.

Referring back to FIG. 3, the hierarchy manager 310 may comprise an event queue 313 that is configured to cache change events 326 that represent the changes to the organizational data represented in the hierarchy tree 400 according to the incoming change requests. In some example embodiments, the event queue 313 caches the change events 326 in memory and loads them from and persist them to the database(s) 320. The hierarchy manager 310 may also comprise a hierarchy loader 311 that loads the hierarchy information from the first hierarchy table 322 in response to the received query request, as well as a hierarchy calibrator 314 that is configured to revise the loaded hierarchy information from the first hierarchy table 322 according to the change events 326 in the event queue 313 in order to provide the correct response to an end user query.

In some example embodiments, the hierarchy loader 311 uses one or more SQL Select statements to load the hierarchy information from the first hierarchy table 322 in response to the received query request. These SQL Select statements may include the left and right numbers previously discussed. In some example embodiments, the hierarchy system 300 automatically generates SQL Select statements based on input from the end user. For example, the end user may submit a request (e.g., via UI elements) for a report of all members that report, directly and indirectly, to Manager B2. In response to this request from the end user, the hierarchy system 300 may automatically generate the SQL Select statement by accessing the active hierarchy table, determining the left and right numbers for Manager B2 (MB2) from the accessed active hierarchy table, and then determining that all members that report to Manager B2 must have a left number greater than 8 and a right number less than 13, thereby resulting in the automatic generation of the following SQL Select statement: Select*from USER_HIERARCHY_TABLE where LEFT_NUMBER>8 and NLR_ORDER_NO<13.

In some example embodiments, the hierarchy manager 310 comprises a table switcher 316 that is configured to manage the respective roles of the first hierarchy table 322 and the second hierarchy table 324, instructing the hierarchy loader 311 as to which hierarchy table, the first hierarchy table 322 or the second hierarchy table 324, to use as the hierarchy table from which to load the latest hierarchy information (e.g., the active hierarchy table to use in servicing the query requests), as well as to instruct a hierarchy updater 315 as to which table to update (e.g., the offline hierarchy table not used in servicing the query requests, but is updated by receiving data as the hierarchy tree 400 is traversed and read). The hierarchy updater 315 may refresh the hierarchy table that is not actively being used to service query requests (e.g., the second hierarchy table 324 in FIG. 3) to persist the latest change events as read from traversing the hierarchy tree 400. A more detailed description of the details of the components of the hierarchy manager 310 with respect to generating the query results in response to the query requests using the active hierarchy table (e.g., the first hierarchy table 322) and the change events 326, as well as updating the offline hierarchy table (e.g., the second hierarchy table 324), will be discussed in further detail below.

Figure 5:
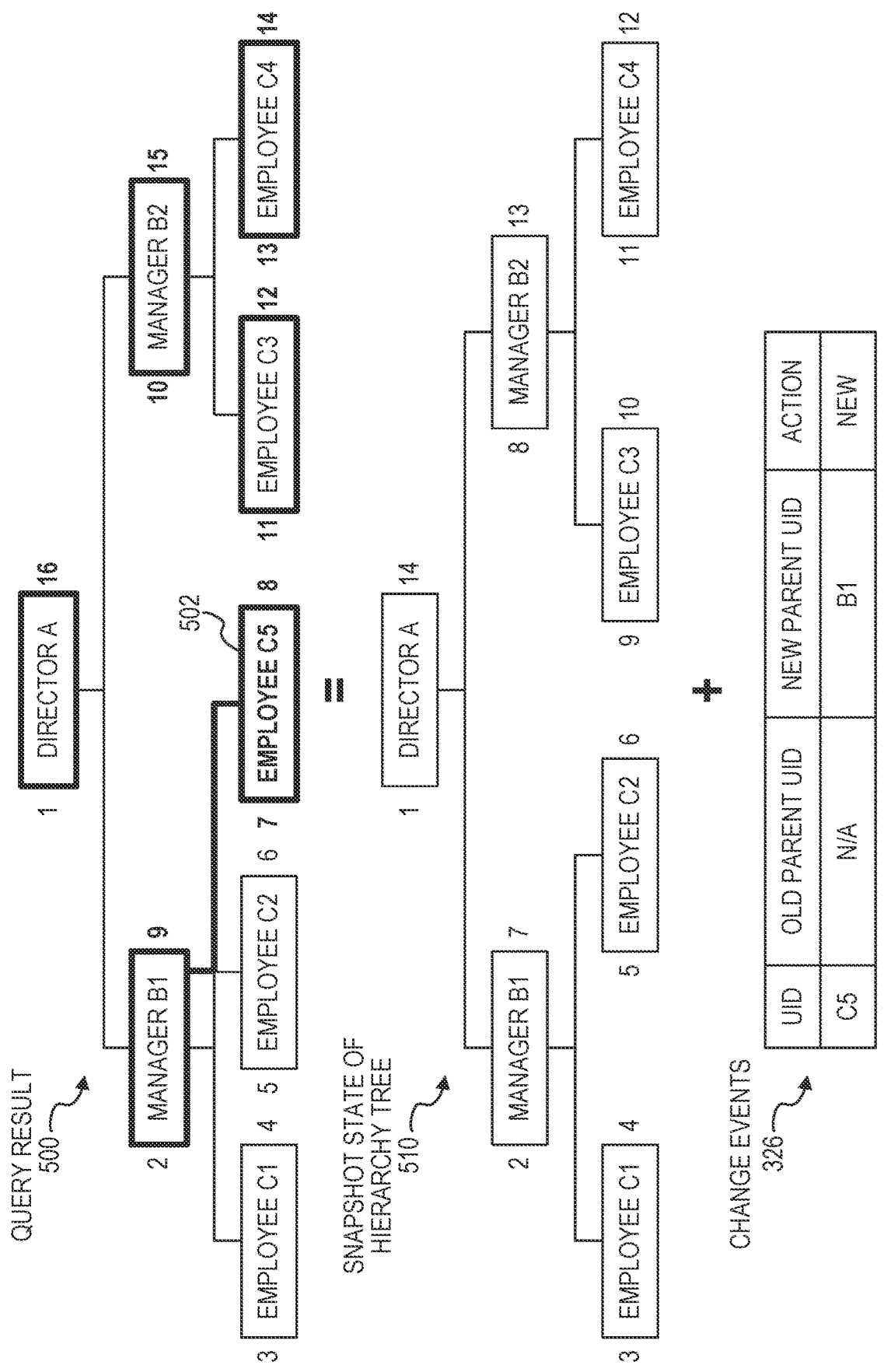
FIG. 5 illustrates a visualization of generating a query result based on a first hierarchy table stored in a database and one or more change events stored in a queue, in accordance with some example embodiments.

FIG. 5 illustrates a visualization of how a query result is generated when the hierarchy tree 500 has been updated to include a new entity being generated based on a first hierarchy table 322 (see Table 2) that represents a snapshot state of the hierarchy tree 510 stored in the database(s) 320 prior to the addition of the new node and one or more change events 326 stored in the event queue 313 that represents the addition of the new node, in accordance with some example embodiments. The snapshot state of the hierarchy tree 510 in FIG. 5 is the same as the hierarchy tree 400 shown in FIG. 4 and yields a first hierarchy table 322 as shown in Table 2. In the example shown in FIG. 5, the snapshot state of the hierarchy tree 510 does not include the change event 326 that occurred subsequent to the point in time at which the first hierarchy table 322 was last updated. The event change 326 shown in FIG. 5 comprises adding a new member "EMPLOYEE C5" to the hierarchy tree. As seen in FIG. 5, even though there is only a single change event 326 that has occurred since the last update of the first hierarchy table 322, there are six entity nodes that are affected by the single change event 326. The corresponding changes to the node entities that would be implemented in response to the single change event 326 are highlighted in bold in the hierarchy tree 500 in FIG. 5, including the addition of a link from the MANAGER B1 entity node to the new EMPLOYEE C5 entity node, as well as a modification of the left and right numbers of the subsequent entity nodes according to the NLR traversal. By using the snapshot state of the hierarchy tree 510 represented in the first hierarchy table 322 as shown in Table 2, along with the change events 326 in the event queue 313, a proper and updated response to a user query representative of the organization data shown in hierarchy tree 500, the hierarchy system 300 is able to provide an accurate real-time representation of the hierarchy tree without being burdened by the excessive computational and time expense associated with updating the active first hierarchy table 322 every time a change event 326 occurs.

In some example embodiments, the following operational flow is used by the hierarchy system 300 to obtain the requested hierarchy information. Initially, the hierarchy system 300 saves a representation of the hierarchy tree 400 in the first hierarchy table 322, such as an NLR traversal result in the first hierarchy table 322, as previously discussed, and the table switcher 316 points to the first hierarchy table 322, thereby assigning the first hierarchy table 322 as the active hierarchy table to service query requests. In response to a query request, the hierarchy loader 311 loads hierarchy data from the first hierarchy table 322 based on its assigned role as the active hierarchy table. The hierarchy loader 311 then passes the loaded hierarchy data from the first hierarchy table 322 to the hierarchy calibrator 314, which amends the loaded hierarchy data according to the change events 326 in the event queue 313 in order to provide accurate real-time hierarchy data as part of a query result generated for the query request.

In some example embodiments, the following operational flow is used by the hierarchy system 300 to process a user request to change entity data in the entity table 328. The entity updater 312 updates the record in the entity table 328 (e.g., updating to reflect a new work address), while, at the same time, reading the change data to determine if organization changes are included (e.g., adding a new employee under an existing manager). If an organization change is found, entity updater 312 forwards that change to event queue 313 so that the change is stored in change events 326. The change event 326 is appended to the event queue 313 and is also persisted to the database(s) 320. The table switcher 316 notifies the hierarchy updater 315 to start updating the offline hierarchy table (e.g., the second hierarchy table 324 in FIG. 3) by receiving data as it is read from traversing the hierarchy tree 400.

In some example embodiments, the following operational flow is used by the hierarchy system 300 to update to the offline hierarchy table (e.g., the second hierarchy table 324 in FIG. 3). The hierarchy updater 315 repeatedly picks a change event 326 from the event queue 313 until there are no more change events 326 in the event queue 313. If there are no change events 326 in the event queue 313, then the hierarchy updater 315 waits for a notification from the event queue 313 indicating that a change event 326 has been added to the event queue 313. For each change event 326, the hierarchy updater 315 updates the offline hierarchy table (e.g., the second hierarchy table 324 in FIG. 3) according to the change event 326. The hierarchy system 300 then instructs the event queue 313 to remove the change event 326 from the event queue 313.

In another example embodiment, instead of the hierarchy updater 315 repeatedly picking a change event 326 from the event queue and updating the offline hierarchy table (e.g., the second hierarchy table 324 in FIG. 3) according to each change event 326, the hierarchy updater 315 may determine that one or more change events 326 are in the event queue 313 and then perform another traversal of the hierarchy tree 400 to generate an updated traversal result to store in the offline hierarchy table, overwriting the previous traversal result. Rather than generating the updated traversal result for each instance of a change event 326 being added to the event queue 313, the hierarchy updater 315 may wait until a minimum threshold number of change events 326 are in the event queue 313 before generating the updated traversal result to store in the offline hierarchy table, thereby addressing the change events 326 in batches to maximize efficiency and minimize computational expense.

In some example embodiments, the hierarchy system 300 updates the offline hierarchy table by performing another traversal of the hierarchy tree when instructed by table switcher 316. The hierarchy system 300 may update the offline hierarchy table (e.g., the second hierarchy table 324 in FIG. 3, the first hierarchy table 322 in FIG. 6) to reflect the traversal result of this subsequent traversal, which may result in changes to values in the offline hierarchy table 322 or 324, such as a shifting of left and right numbers of certain node entities (e.g., the modification of the left and right numbers of the subsequent entity nodes previously discussed with respect to the example of FIG. 5). Since the associated changes of the subsequent traversal are applied to the offline hierarchy table during the update rather than being applied to the active hierarchy table, the hierarchy system 300 mitigates the technical problems associated with applying a significant amount of changes, since the hierarchy system 300 does not need to interrupt service in order to perform the update, as it is using the first hierarchy table 322 to service requests while the second hierarchy table 324 acting as the offline hierarchy table is being updated. The hierarchy system 300 applies the heavy lifting of performing the update to the offline hierarchy table rather than to the active hierarchy table that is servicing query requests.

After the offline hierarchy table has been updated and the change event 326 has been removed from the event queue 313 due to the updated offline hierarchy table including all of the latest updates, the table switcher 316 switches the roles of the first hierarchy table 322 and the second hierarchy table 324. For example, while the first hierarchy table 322 is assigned the role of the active hierarchy table servicing query requests and the second hierarchy table 324 is assigned the role of the offline hierarchy table not servicing query requests but is instead being updated by writing data from traversing the hierarchy tree in FIG. 3, the table switcher 316 may switch these role assignments, assigning the second hierarchy table 324 to be the active hierarchy table that services query results and the assigning the first hierarchy table 322 to be the offline hierarchy table that does not service query results but is instead being updated by writing data from traversing the tree, as seen in the example embodiment of FIG. 6. In some example embodiments, especially where the change event does not change entity data stored in entity table 328, each change event 326 comprises four fields: (1) ID, which is the ID of the entity (e.g., user or member of an organization) to which the requested change is to be applied, (2) Old-parent-ID, which is the ID of the original parent of the entity, (3) New-parent-ID, which is the ID of the new parent of the entity, and (4) Action, which is the action that triggers the change request.

The change events 326 may include, but are not limited to, adding an entity to the hierarchy tree 400, removing an entity from the hierarchy tree 400, and moving an entity from one position in the hierarchy tree 400 to another position in the hierarchy tree 400.

One example of a change event 326 in which an entity is being added to the hierarchy tree 400 may be represented as follows:

| ID | Old-parent-ID | New-parent-ID | Action |
|----|---------------|---------------|--------|
| C5 | N/A | B1 | add |

One example of a change event 326 in which an entity is being removed from the hierarchy tree 400 may be represented as follows:

| ID | Old-parent-ID | New-parent-ID | Action |
|----|---------------|---------------|--------|
| C5 | MB1 | N/A | remove |

One example of a change event 326 in which an entity is being moved from one position in the hierarchy tree 400 to another position in the hierarchy tree 400 may be represented as follows:

| ID | Old-parent-ID | New-parent-ID | Action |
|----|---------------|---------------|--------|
| C5 | MB1 | MB2 | move |

In some example embodiments, after the hierarchy information is fetched from the active hierarchy table (e.g., the first hierarchy table 322 in FIG. 3 or the second hierarchy table 324 in FIG. 6) in generating a query result in response to a received query request, the hierarchy calibrator 314 revises the fetched hierarchy information according to the change event(s) 326 in the event queue 313. Examples of how query results are generated by revising the fetched hierarchy information from the active hierarchy table with the change event(s) 326 from the event queue 313 are discussed below. These examples use the hierarchy tree 400 from FIG. 4 as the baseline hierarchy representation reflected in the first hierarchy table 322, and use a query request that requests information about each member of the organization that reports to DIRECTOR A and that does not exceed a level depth of level 2.

In one example, the change events 326 comprise adding new leaf nodes as follows:

| Event # | ID | Old-parent-ID | New-parent-ID | Action |
|---------|----|---------------|---------------|--------|
| 1 | C5 | N/A | B1 | Add |
| 2 | C11 | N/A | C1 | Add |
| 3 | B3 | N/A | A1 | Add |

Here, for each change event 326 that is identified in the table above by the a different event number (e.g., Event #1, Event #2, etc.), the hierarchy system 300 determines whether the corresponding New parent-ID is in the fetched hierarchy tree 400 as stored in the active hierarchy table (e.g., the first hierarchy table 322 in FIG. 3, the second hierarchy table 324 in FIG. 6) and whether the New parent ID is not a leaf node. In other words, if the results in response to the user generated query should include children node(s) of a parent node in the change events 326, then hierarchy calibrator 314 will supplement the information read from the active hierarchy table (e.g., the first hierarchy table 322 in FIG. 3 or the second hierarchy table 324 in FIG. 6) with data from change events 326 to provide the user with an up-to-date response. In some example embodiments, the hierarchy system 300 is configured to supplement the data fetched from the active hierarchy table by: (i) determining the level to which the response is requested, (ii) determining if any of the added nodes in the change events have parent nodes that are responsive to the query, (iii) if it is determined that any of the added nodes in the change events do have parent nodes that are responsive to the query, then checking the level of the query to determine if the added node has the level that is relevant to the query, (iv) if it is determined that the added node has the level that is relevant to the query, then adding the added node to the fetched results from the active hierarchy table, and (v) returning the modified results to the end user in response to the query request by the end user. Using the example Events #1, #2, and #3 in the table above along with the query request that requests information about each member of the organization that reports to DIRECTOR A and that does not exceed a level depth of level 2, the corresponding change events 326 for Events #1 and #3 are incorporated into the generated query result, whereas the corresponding change event 326 for Event #2 is ignored.

In one example, the change events 326 comprise removing entity nodes as follows:

| Event # | ID | Old-parent-ID | New-parent-ID | Action |
|---------|----|---------------|---------------|--------|
| 4 | C2 | B1 | N/A | remove |
| 5 | B2 | A1 | N/A | remove |
| 6 | C11 | C1 | N/A | remove |

Figure 6:
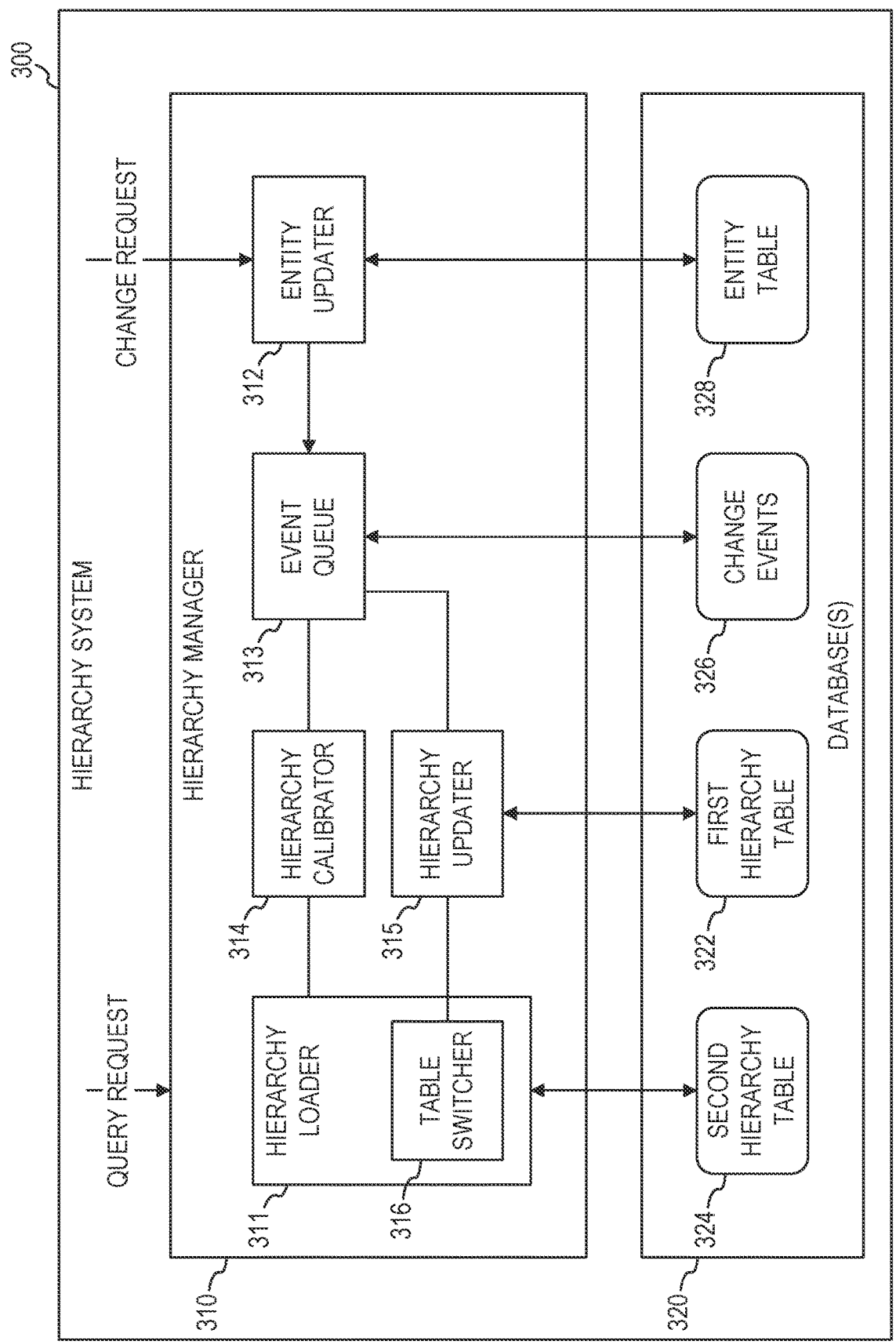
FIG. 6 is a block diagram illustrating the hierarchy system with the roles of the hierarchy tables being switched, in accordance with some example embodiments.

Here, for each change event 326 that is identified in the table above, the hierarchy system 300 determines if the corresponding ID is in the fetched hierarchy information as stored in the active hierarchy table (e.g., the first hierarchy table 322 in FIG. 3 or the second hierarchy table 324 in FIG. 6). If it is determined that the corresponding ID is in the fetched information, then the hierarchy system 300 removes the node of the corresponding ID from the query result that is then returned to the end user as modified by the change event 326.

In one example, the change events 326 comprise moving entity nodes as follows:

| Event # | ID | Old-parent-ID | New-parent-ID | Action |
|---------|----|---------------|---------------|--------|
| 7 | B1 | A1 | A2 | move |
| 8 | C3 | B2 | B1 | move |
| 9 | C4 | B2 | A1 | move |
| 10 | B11 | A2 | A1 | move |

Change events in which an entity node is being moved from one position to another position in the hierarchy can be divided into three types of move events:
  (1) Move-in event: in this type of change event, the Old-parent-ID is not in the fetched hierarchy results from the active hierarchy table (e.g., the first hierarchy table 322 in FIG. 3, the second hierarchy table 324 in FIG. 6), but the New-parent-ID is in the fetched hierarchy table results. For example, the Event #10 in the table above is a move-in event.

(2) Move-out event: in this type of change event, the Old-parent-ID is in the fetched hierarchy results from the active hierarchy table (e.g., the first hierarchy table 322 in FIG. 3 or the second hierarchy table 324 in FIG. 6), but the New-parent-ID is not in the fetched hierarchy table results. For example, the Event #7 in the table above is a move-out event.

(3) Move-around event: in this type of change event, both the Old-parent-ID and the New-parent-ID are in the hierarchy. For example, the Events #8 and #9 in the table above are move-around events.

As change events 326 keep coming in via change requests, the change events 326 to be processed for a query request become more and more. In order to decrease the number of change events 326 to process for generating a query result for a query request, the hierarchy updater 315 may take a batch of change events 326 in the event queue 313, and then process the change events 326 to update the entire hierarchy in memory and save in the offline hierarchy table. As previously discussed, the hierarchy table to which to apply and save the change event 326 is specified by the table switcher 316. The hierarchy updater 315 may ask the table switcher 316 to identify which hierarchy table to save as the updated hierarchy table. After the hierarchy updater 315 saves the data to the specified hierarchy table, the hierarchy updater 315 may mark the state of the change event 326 that has been processed as "processed" and ask the event queue 313 to remove the processed change event 326 from the event queue 313. After the even queue 313 saves the change of state for the processed change event 326, the hierarchy updater 315 may submit a request to the table switcher 316 to switch roles for the hierarchy tables, thereby causing the active hierarchy table to become the offline hierarchy table and the offline hierarchy table to become the active hierarchy table. The hierarchy system 300 may then use the newly-assigned active hierarchy table in generating query results for query requests.

In some example embodiments, instead of the hierarchy updater 315 taking change events 326 from the event queue 313 to update the offline hierarchy, the hierarchy updater 315 may update the offline hierarchy table by performing another traversal of the hierarchy tree 400 to generate an updated traversal result to store in the offline hierarchy table, overwriting the previous traversal result.

Figure 7A:
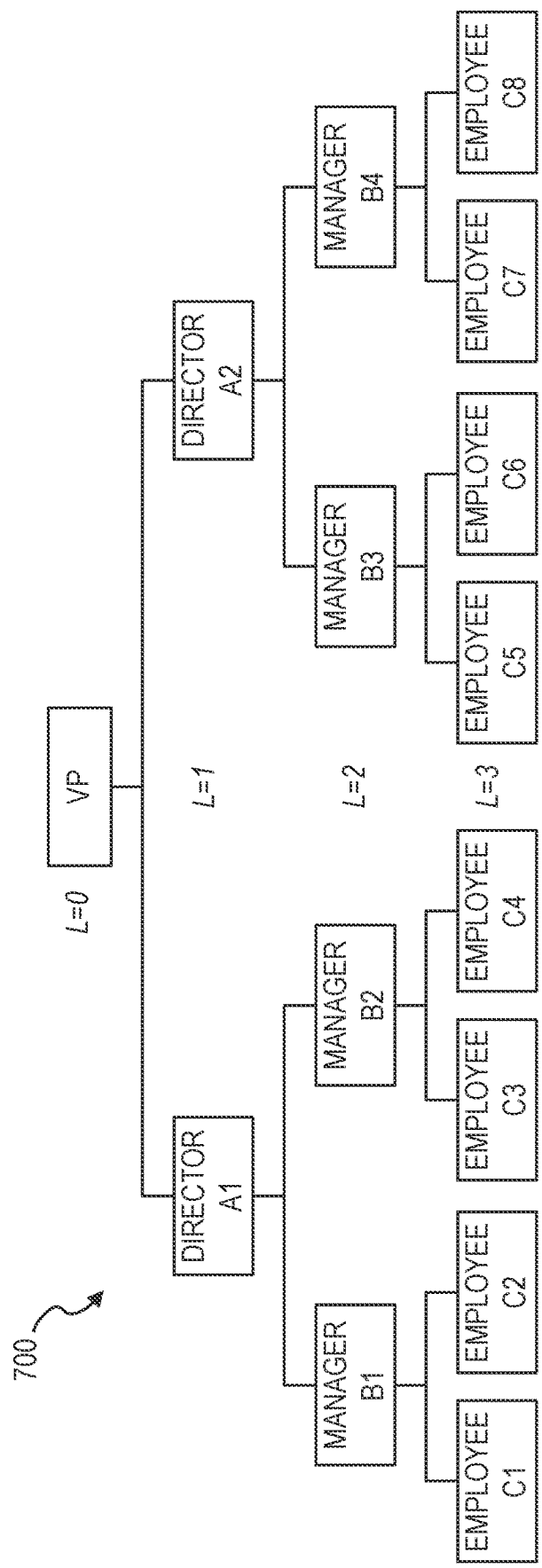
FIG. 7A illustrates another hierarchy tree, in accordance with some example embodiments.

FIG. 7A illustrates another hierarchy tree 700, in accordance with some example embodiments. Similar to the hierarchy tree 400 in FIG. 4, the hierarchy tree 700 in FIG. 7A comprises entities that represent members of an organization, where the entities are represented by nodes of the hierarchy tree 700. The root node of the hierarchy tree 700 is labeled "VP" and represents a vice-president within the organization. The root node has two children labeled respectively "DIRECTOR A" and "DIRECTOR B" that each represent a corresponding director within the organization. The "DIRECTOR A" and "DIRECTOR B" nodes each have children nodes that represent managers within the organization (e.g., MANAGER B1, MANAGER B2, MANAGER B3, MANAGER B4), and the manager nodes each have children nodes that represent employees (e.g., EMPLOYEE C1, EMPLOYEE C2, EMPLOYEE C3, EMPLOYEE C4, etc.) that are one level below the manager nodes. The different levels of the hierarchy tree 700 are shown using L to represent the level (e.g., L=0, L=1, L=2, etc.). In FIG. 7A, the level L starts at 0 for the root node and then increments by one for each step down the hierarchy tree 700.

Figure 7B:
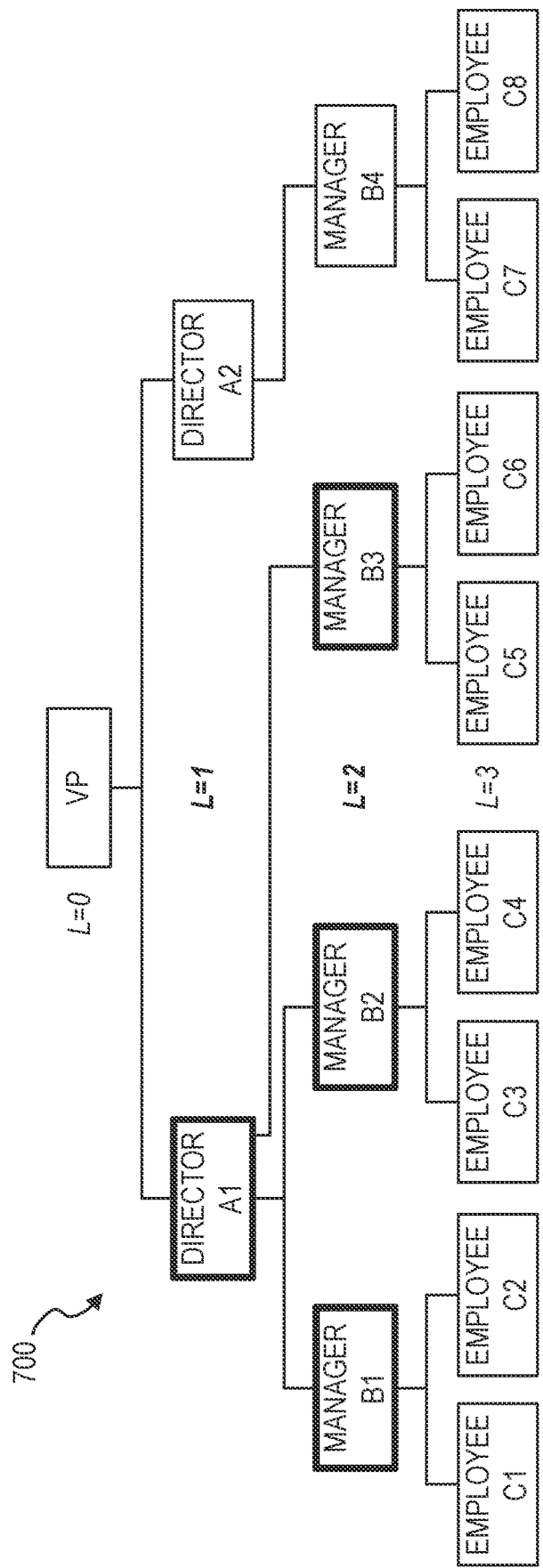
FIG. 7B illustrates the hierarchy tree of FIG. 7A after application of a move-in change event, in accordance with some example embodiments.

FIG. 7B illustrates the hierarchy tree 700 of FIG. 7A after application of a move-in change event, in accordance with some example embodiments. In FIG. 7B, the move-in change event is as follows:

| ID | Old-parent-ID | New-parent-ID | Action |
|----|---------------|---------------|--------|
| B3 | A2            | A1            | move   |

In one example, this move-in change event is retrieved from the event queue 313 for use in generating a query result for a query request to load members that report to DIRECTOR A1 with level L=2 (e.g., members that do not exceed level L=2). The original result that is retrieved by the hierarchy system 300 from the first hierarchy table 322 would include MANAGER B1 and B2, since they are the only members that satisfy the requirements of reporting to DIRECTOR A1 and being at level L=2. However, the hierarchy system 300 also checks the change event 326 to determine if there are any entries relevant to the query request and should be included in the query result. Since the change event is a move change event, where this particular move is viewed as a move-in event with respect to the user's query, the hierarchy system 300 checks the New-parent-ID's level L in the selected hierarchy and compares it with the request level Lr. Here, the New-parent-ID is A1 and its level L in the selected hierarchy is 1 and the request level lr is 2. Since the level L of the New-parent-ID, which is 1, is less than the requested level Lr, which is 2, the hierarchy system 300 includes MANAGER B3 in the query result. The hierarchy system 300 then compares the new level of the employees reporting to MANAGER B3 (e.g., what the level of the employees would be after the change event is implemented) with the request level. In this example, since the new level of these employees, EMPLOYEE C5 and EMPLOYEE C6, is 3, the hierarchy system 300 determines that the new level of these employees is greater than the requested level Lr, which is 2, and therefore excludes EMPLOYEE C5 and EMPLOYEE C6 from the query result. In FIG. 7B, the nodes that are included in the query result, DIRECTOR A1, MANAGER B1, MANAGER B2, and MANAGER B3, are highlighted in bold.

Figure 7C:
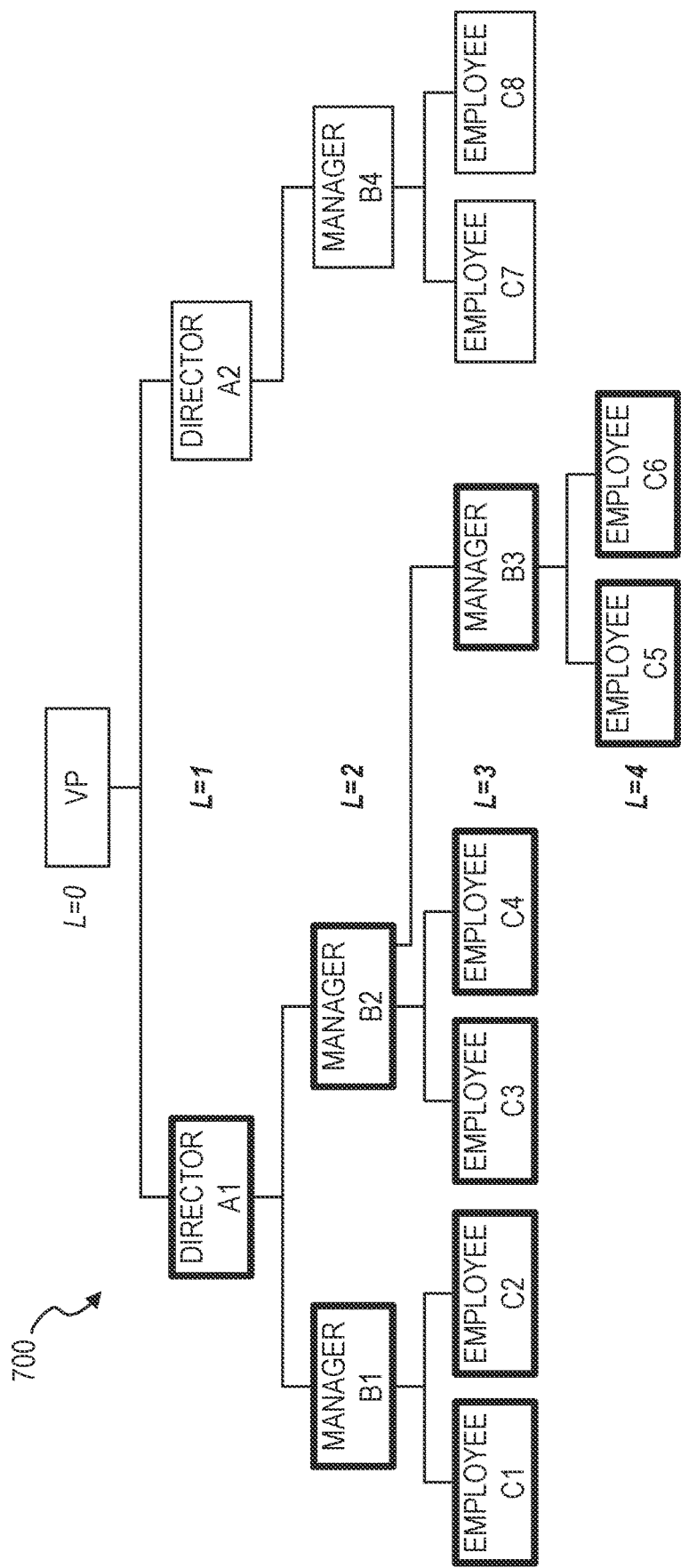
FIG. 7C illustrates the hierarchy tree of FIG. 7A after application of another move-in change event, in accordance with some example embodiments.

FIG. 7C illustrates the hierarchy tree 700 of FIG. 7A after application of another move-in change event, in accordance with some example embodiments. In FIG. 7C, the move-in change event is as follows:

| ID | Old-parent-ID | New-parent-ID | Action |
|----|---------------|---------------|--------|
| B3 | A2            | B2            | move   |

In one example, this move change event is retrieved from the event queue 313 for use in generating a query result for a query request to load members that report to DIRECTOR A1 with level L=4 (e.g., members that do not exceed level L=4). The original result that is retrieved by the hierarchy system 300 from the first hierarchy table 322 would include MANAGER B1 and MANAGER B2, as well as their respective children, EMPLOYEE C1, EMPLOYEE C2, EMPLOYEE C3, and EMPLOYEE C4, since they are the only members that satisfy the requirements of reporting to DIRECTOR A1 and not exceeding level L=4. However, the hierarchy system 300 also checks the move change event to determine if it is relevant to the query request and should be included in the query result. Since the change event is a move-in change event, the hierarchy system 300 checks the New-parent-ID's level L in the selected hierarchy and compares it with the request level Lr. Here, the New-parent-ID is B2 and its level L in the selected hierarchy is 2 and the request level Lr is 4. Since the level L of the New-parent-ID, which is 2, is less than the requested level Lr, which is 4, the hierarchy system 300 includes MANAGER B3 in the query result. The hierarchy system 300 then compares the new level of the employees reporting to MANAGER B3 (e.g., what the level of the employees would be after the change event is implemented) with the request level. In this example, since the new level of these employees, EMPLOYEE C5 and EMPLOYEE C6, is 4, the hierarchy system 300 determines that the new level of these employees is equal to the requested level Lr, which is also 4, and therefore includes EMPLOYEE C5 and EMPLOYEE C6 in the query result. In FIG. 7C, the nodes that are included in the query result, DIRECTOR A1, MANAGER B1, MANAGER B2, MANAGER B3, EMPLOYEE C1, EMPLOYEE C2, EMPLOYEE C3, EMPLOYEE C4, EMPLOYEE C5, AND EMPLOYEE C6, are highlighted in bold.

Figure 8:
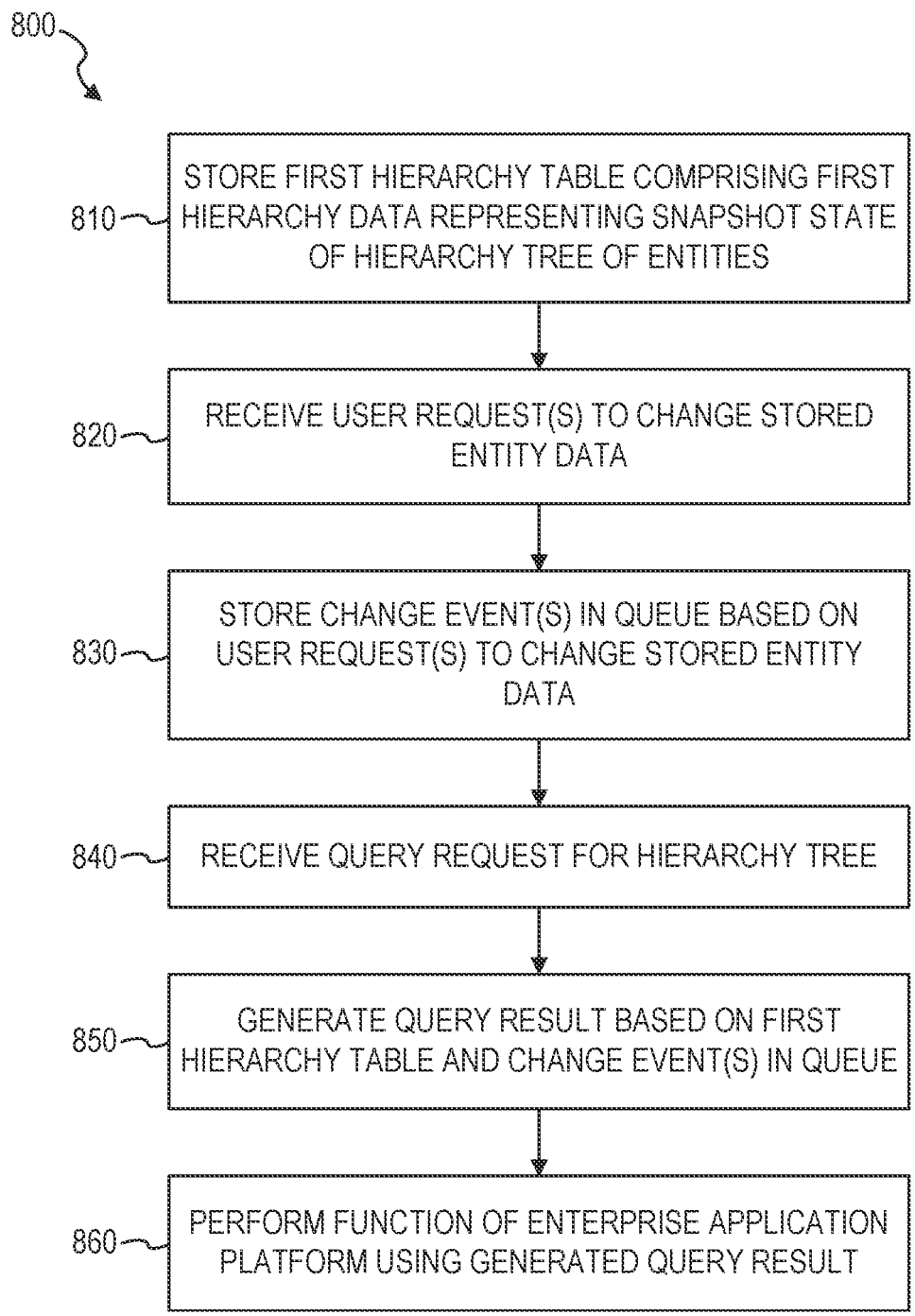
FIG. 8 is a flowchart illustrating a method of providing an efficient real-time hierarchy based on change events, in accordance with some example embodiments.

FIG. 8 is a flowchart illustrating a method 800 of providing an efficient real-time response to query of hierarchy data that includes change events, in accordance with some example embodiments. The method 800 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 800 are performed by the hierarchy system 300 of FIGS. 3 and 6 (e.g., any combination of one or more of the components of the hierarchy system 300), as described above.

At operation 810, the hierarchy system 300 stores a first hierarchy table 322 in a database 320. In some example embodiments, the first hierarchy table 322 comprises first hierarchy data that represents a snapshot state of a hierarchy tree 400 of entities at a first point in time, where the first hierarchy table 322 has last been updated at the first point in time. The first hierarchy data may comprise a result of a pre-order (NLR) traversal of the hierarchy tree 400. In some example embodiments, the entities of the hierarchy tree 400 may comprise members of an organization, such as employees of a company. However, other types of entities are also within the scope of the present disclosure.

Subsequent to the first point in time, the hierarchy system 300 receives one or more user requests to change entity data stored in a data storage structure, at operation 820. In some example embodiments, the data storage structure comprises the entity table 328 in which the entity data is stored. However, other types of data storage structures are also within the scope of the present disclosure. The entity data stored in the data storage structure may represent how entities are organized within the hierarchy tree 400. In some example embodiments, the one or more user requests to change entity data comprise one or more of a request to add an entity to the hierarchy tree 400, a request to remove an entity from the hierarchy tree 400, and a request to move an entity from one position in the hierarchy tree 400 to another position in the hierarchy tree 400. However, other types of requests to change entity data are also within the scope of the present disclosure.

Then, at operation 830, the hierarchy system 300 stores one or more change events 326 in a queue, such as the event queue 313, based on the receiving of the one or more user requests to change entity data. The change event(s) 326 represent the one or more requested changes of entity data.

As shown in FIG. 3, the entity updater 312 may add the change events 326 to the event queue 313 in response to receiving the corresponding change requests and implementing the corresponding changes in the entity table 328.

At operation 840, the hierarchy system 300 receives a first query request for results of the hierarchy tree as stored in the first hierarchy table 322 subsequent to the receiving of the one or more user requests to change entity data. For example, a user of the enterprise application platform 112 may submit a request for information of the hierarchy tree via a user interface of a computing device of the user, such as a request for all members of a company that are within a specified department or that report to a specific director or manager.

Next, the hierarchy system 300, in response to the receiving of the first query request, generates a first query result based on the first hierarchy table 322 stored in the database 320 and the one or more change events 326 stored in the queue, at operation 850. For example, the hierarchy loader 311 may load hierarchy data from the first hierarchy table 322 and the hierarchy calibrator 314 may revise the loaded hierarchy data using the change event(s) 326 from the event queue 313.

Then, at operation 860, the hierarchy system 300 performs a function of an enterprise application platform using the generated first query result. In some example embodiments, the function comprises displaying the generated first query result on a computing device. However, other types of functions are also within the scope of the present disclosure.

It is contemplated that any of the other features described within the present disclosure can be incorporated into the method 800.

Figure 9:
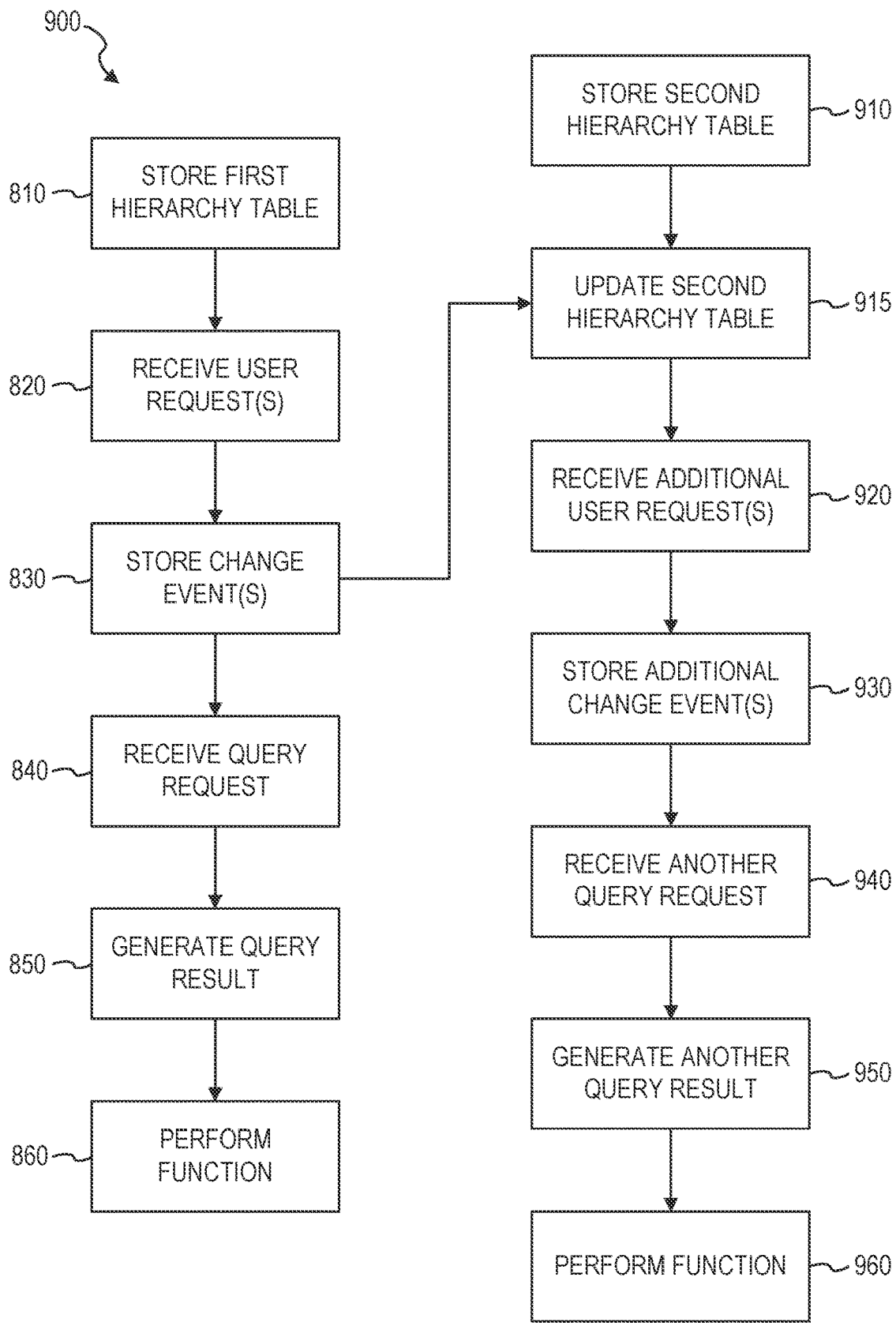
FIG. 9 is a flowchart illustrating another method of providing an efficient real-time hierarchy based on change events, in accordance with some example embodiments.

FIG. 9 is a flowchart illustrating another method 900 of providing an efficient real-time hierarchy-based results in response to a user query based on change events, in accordance with some example embodiments. The method 900 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 900 are performed by the hierarchy system 300 of FIGS. 3 and 6 (e.g., any combination of one or more of the components of the hierarchy system 300), as described above. The method 900 comprises operations performed in combination with the operations of the method 800 shown in FIG. 8. Operations 810-860 shown in FIG. 9 are short-hand description of corresponding operations 810-860 as previously described in relation to FIG. 8.

At operation 910, the hierarchy system 300 stores a second hierarchy table 324 in the database(s) 320. The second hierarchy table 324 is different from the first hierarchy table 322 and comprises second hierarchy data that represents an updated state of the hierarchy tree 400 of entities at a second point in time that is subsequent to the first point in time of the snapshot state of the first hierarchy table 322.

Prior to the receiving of the first query request at operation 840, the hierarchy system 300 may update the stored second hierarchy table 324, at operation 915, based on the one or more user requests to change entity data that are received at operation 820. The hierarchy system 300 may use the change event(s) 326 corresponding to the user request(s), such as the change event(s) 326 stored in the event queue 313, to update the stored second hierarchy table 324. At this point in the method 900, the updated second hierarchy table 324 is not being used to generate any query results, but is rather acting as the offline hierarchy table, while the first hierarchy table 322 is acting as the active hierarchy table that is used to generate query results for query requests. In some example embodiments, the hierarchy system 300 may determine that one or more change events 326 are in the event queue 313 and then perform another traversal of the hierarchy tree 400 to generate an updated traversal result to store in the offline hierarchy table (e.g., the second hierarchy table 324 in FIG. 3), overwriting the previous traversal result. Rather than generating the updated traversal result for each instance of a change event 326 being added to the event queue 313, the hierarchy system 300 may wait until a minimum threshold number of change events 326 are in the event queue 313 before generating the updated traversal result to store in the offline hierarchy table, thereby addressing the change events 326 in batches to maximize efficiency and minimize computational expense.

At operation 920, subsequent to the generating the first query result at operation 850, the hierarchy system 300 may receive one or more additional user requests to change entity data stored in the data storage structure. The additional user request(s) to change entity data may be similar to the user request(s) received at operation 820.

Then, the hierarchy system 300 may store one or more additional change events 326 in the event queue, at operation 930, based on the receiving of the one or more additional user requests to change entity data, similar to the storing of the change event(s) 326 performed at operation 830. The additional change event(s) may represent the additional requested changes of entity data.

Next, at operation, 940, subsequent to the generating of the first query result at operation 850, the hierarchy system 300 receives a second query request for the hierarchy tree. At this point in the method 900, the table switcher 316 may have switched the roles of the first hierarchy table 322 and the second hierarchy table 324, assigning the second hierarchy table 324 to be the active hierarchy table that is used in servicing query requests and assigning the first hierarchy table 324 to be the offline hierarchy table that is not used in servicing query requests. Prior to the receiving of the second query request at operation 940, the hierarchy system 300 may have updates the stored first hierarchy table 322 based on the additional user request(s) to change entity data, where the updated first hierarchy table 322 at this point is not being used to generate any query results.

In response to the receiving of the second query request, the hierarchy system 300 may generate a second query result based on the updated second hierarchy table 324 without using the first hierarchy table 322, at operation 950. In some example embodiments, the generating of the second query result is further based the additional change event(s) 326 stored in the event queue 313 at operation 930.

Then, at operation 960, the hierarchy system 300 performs a function of the enterprise application platform 112 using the second query result that was generated at operation 950. The function performed at operation 960 may be the same type of function performed at operation 860, such as displaying the generated second query result on a computing device. However, the function performed at operation 950 may be another type of function different from the type of function performed at operation 860.

It is contemplated that any of the other features described within the present disclosure can be incorporated into the method 900.

The following paragraphs provide example embodiments.

Example 1 includes a computer-implemented method performed by a system having a memory and at least one hardware processor, the computer-implemented method comprising: storing a first hierarchy table in a database, the first hierarchy table comprising first hierarchy data that represents a snapshot state of a hierarchy tree of entities at a first point in time, the first hierarchy table having been last updated at the first point in time; subsequent to the first point in time, receiving one or more user requests to change entity data stored in a data storage structure, the entity data stored in the data storage structure representing entities of the hierarchy tree; storing one or more change events in a queue based on the receiving of the one or more user requests to change entity data, the one or more change events representing the one or more requested changes of entity data; receiving a first query request for the hierarchy tree subsequent to the receiving of the one or more user requests to change entity data; in response to the receiving of the first query request, generating a first query result based on the first hierarchy table stored in the database and the one or more change events stored in the queue; and performing a function of an enterprise application platform using the generated first query result.

Example 2 includes the computer-implemented method of example 1, wherein the first hierarchy data comprises a result of a pre-order (NLR) traversal of the hierarchy tree.

Example 3 includes the computer-implemented method of example 1 or example 2, wherein the one or more user requests to change entity data comprise one or more of a request to add an entity to the hierarchy tree, a request to remove an entity from the hierarchy tree, and a request to move an entity from one position in the hierarchy tree to another position in the hierarchy tree.

Example 4 includes the computer-implemented method of any one of examples 1 to 3, further comprising: storing a second hierarchy table in the database, the second hierarchy table being different from the first hierarchy table and comprising second hierarchy data that represents an updated state of the hierarchy tree of entities at a second point in time subsequent to the first point in time; prior to the receiving of the first query request, updating the stored second hierarchy table based on the one or more user requests to change entity data, the updated second hierarchy table not being used to generate the first query result; subsequent to the generating of the first query result, receiving a second query request for the hierarchy tree; in response to the receiving of the second query request, generating a second query result based on the updated second hierarchy table without using the first hierarchy table; and performing the function of the enterprise application platform using the generated second query result.

Example 5 includes the computer-implemented method of any one of examples 1 to 4, further comprising: subsequent to the generating the first query result and prior to the receiving of the second query request, receiving one or more additional user requests to change entity data stored in the data storage structure; and storing one or more additional change events in the queue based on the receiving of the one or more additional user requests to change entity data, the one or more additional change events representing the one or more additional requested changes of entity data, wherein the generating of the second query result is further based the one or more additional change events stored in the queue.

Example 6 includes the computer-implemented method of any one of examples 1 to 5, further comprising: prior to the receiving of the second query request, updating the stored first hierarchy table based on the one or more additional user requests to change entity data, the updated first hierarchy table not being used to generate the second query result.

Example 7 includes the computer-implemented method of any one of examples 1 to 6, wherein the entities of the hierarchy tree comprise members of an organization.

Example 8 includes the computer-implemented method of any one of examples 1 to 7, wherein the data storage structure comprises an entity table in which the entity data is stored.

Example 9 includes the computer-implemented method of any one of examples 1 to 8, wherein the function comprises displaying the generated first query result on a computing device.

Example 10 includes a system comprising: at least one processor; and a non-transitory computer-readable medium storing executable instructions that, when executed, cause the at least one processor to perform the method of any one of examples 1 to 9.

Example 11 includes a non-transitory machine-readable storage medium, tangibly embodying a set of instructions that, when executed by at least one processor, causes the at least one processor to perform the method of any one of examples 1 to 9.

Example 12 includes a machine-readable medium carrying a set of instructions that, when executed by at least one processor, causes the at least one processor to carry out the method of any one of examples 1 to 9.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 10:
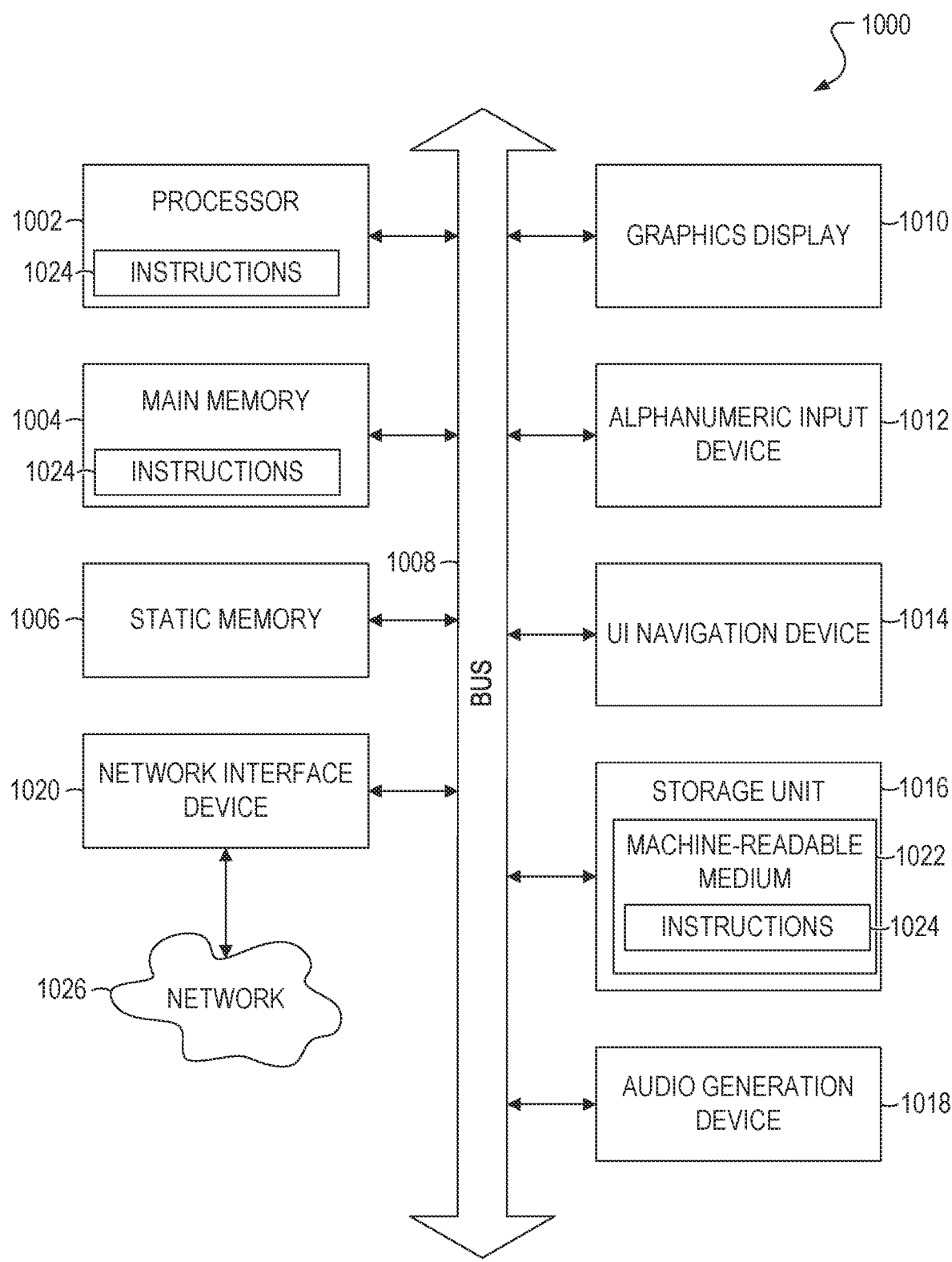
FIG. 10 is a block diagram of an example computer system on which methodologies described herein can be executed, in accordance with some example embodiments.

FIG. 10 is a block diagram of a machine in the example form of a computer system 1000 within which instructions 1024 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004, and a static memory 1006, which communicate with each other via a bus 1008. The computer system 1000 may further include a graphics or video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a storage unit (e.g., a disk drive unit) 1016, an audio or signal generation device 1018 (e.g., a speaker), and a network interface device 1020.

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks, magneto-optical disks; and compact disc-read-only memory (CD-ROM) and digital versatile disc (or digital video disc) read-only memory (DVD-ROM) disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system having a memory and at least one hardware processor, the computer-implemented method comprising:

storing a first hierarchy table in a database, the first hierarchy table comprising first hierarchy data that represents a snapshot state of a hierarchy tree of entities at a first point in time, the first hierarchy table having been last updated at the first point in time;

subsequent to the first point in time, receiving one or more user requests to change entity data stored in a data storage structure, the entity data stored in the data storage structure representing entities of the hierarchy tree;

storing one or more change events in a queue based on the receiving of the one or more user requests to change entity data, the one or more change events representing the one or more requested changes of entity data;

receiving a first query request for the hierarchy tree subsequent to the receiving of the one or more user requests to change entity data;

in response to the receiving of the first query request, retrieving the one or more change events stored in the queue and generating a first query result based on the first hierarchy table stored in the database and the retrieved one or more change events; and performing a function of an enterprise application platform using the generated first query result.

2. The computer-implemented method of claim 1, wherein the first hierarchy data comprises a result of a pre-order (NLR) traversal of the hierarchy tree.

3. The computer-implemented method of claim 1, wherein the one or more user requests to change entity data comprise one or more of a request to add an entity to the hierarchy tree, a request to remove an entity from the hierarchy tree, and a request to move an entity from one position in the hierarchy tree to another position in the hierarchy tree.

4. The computer-implemented method of claim 1, further comprising:

storing a second hierarchy table in the database, the second hierarchy table being different from the first hierarchy table and comprising second hierarchy data that represents an updated state of the hierarchy tree of entities at a second point in time subsequent to the first point in time;

prior to the receiving of the first query request, updating the stored second hierarchy table based on the one or more user requests to change entity data, the updated second hierarchy table not being used to generate the first query result;

subsequent to the generating of the first query result, receiving a second query request for the hierarchy tree;

in response to the receiving of the second query request, generating a second query result based on the updated second hierarchy table without using the first hierarchy table; and performing the function of the enterprise application platform using the generated second query result.

5. The computer-implemented method of claim 4, further comprising:

subsequent to the generating the first query result and prior to the receiving of the second query request, receiving one or more additional user requests to change entity data stored in the data storage structure; and storing one or more additional change events in the queue based on the receiving of the one or more additional user requests to change entity data, the one or more additional change events representing the one or more additional requested changes of entity data, wherein the generating of the second query result is further based the one or more additional change events stored in the queue.

6. The computer-implemented method of claim 5, further comprising:

prior to the receiving of the second query request, updating the stored first hierarchy table based on the one or more additional user requests to change entity data, the updated first hierarchy table not being used to generate the second query result.

7. The computer-implemented method of claim 1, wherein the entities of the hierarchy tree comprise members of an organization.

8. The computer-implemented method of claim 1, wherein the data storage structure comprises an entity table in which the entity data is stored.

9. The computer-implemented method of claim 1, wherein the first query request is received from a user of a computing device, and the function comprises displaying the generated first query result on the computing device.

10. A system of comprising:

at least one hardware processor; and a non-transitory computer-readable medium of the managed private cloud architecture, the non-transitory computer-readable medium storing executable instructions that, when executed, cause the at least one processor to perform operations comprising:

storing a first hierarchy table in a database, the first hierarchy table comprising first hierarchy data that represents a snapshot state of a hierarchy tree of entities at a first point in time, the first hierarchy table having been last updated at the first point in time;

subsequent to the first point in time, receiving one or more user requests to change entity data stored in a data storage structure, the entity data stored in the data storage structure representing entities of the hierarchy tree;

storing one or more change events in a queue based on the receiving of the one or more user requests to change entity data, the one or more change events representing the one or more requested changes of entity data;

receiving a first query request for the hierarchy tree subsequent to the receiving of the one or more user requests to change entity data;

in response to the receiving of the first query request, retrieving the one or more change events stored in the queue and generating a first query result based on the first hierarchy table stored in the database and the retrieved one or more change events; and performing a function of an enterprise application platform using the generated first query result.

11. The system of claim 10, wherein the first hierarchy data comprises a result of a pre-order (NLR) traversal of the hierarchy tree.

12. The system of claim 10, wherein the one or more user requests to change entity data comprise one or more of a request to add an entity to the hierarchy tree, a request to remove an entity from the hierarchy tree, and a request to move an entity from one position in the hierarchy tree to another position in the hierarchy tree.

13. The system of claim 10, wherein the operations further comprise:

storing a second hierarchy table in the database, the second hierarchy table being different from the first hierarchy table and comprising second hierarchy data that represents an updated state of the hierarchy tree of entities at a second point in time subsequent to the first point in time;

prior to the receiving of the first query request, updating the stored second hierarchy table based on the one or more user requests to change entity data, the updated second hierarchy table not being used to generate the first query result;

subsequent to the generating of the first query result, receiving a second query request for the hierarchy tree;

in response to the receiving of the second query request, generating a second query result based on the updated second hierarchy table without using the first hierarchy table; and performing the function of the enterprise application platform using the generated second query result.

14. The system of claim 13, wherein the operations further comprise:
subsequent to the generating the first query result and prior to the receiving of the second query request, receiving one or more additional user requests to change entity data stored in the data storage structure; and
storing one or more additional change events in the queue based on the receiving of the one or more additional user requests to change entity data, the one or more additional change events representing the one or more additional requested changes of entity data,
wherein the generating of the second query result is further based the one or more additional change events stored in the queue.

15. The system of claim 14, wherein the operations further comprise:
prior to the receiving of the second query request, updating the stored first hierarchy table based on the one or more additional user requests to change entity data, the updated first hierarchy table not being used to generate the second query result.

16. The system of claim 10, wherein the entities of the hierarchy tree comprise members of an organization.

17. The system of claim 10, wherein the data storage structure comprises an entity table in which the entity data is stored.

18. The system of claim 10, wherein the first query request is received from a user of a computing device, and the function comprises displaying the generated first query result on the computing device.

19. A non-transitory machine-readable storage medium of a managed private cloud architecture serving an organization, the non-transitory machine-readable storage medium tangibly embodying a set of instructions that, when executed by at least one hardware processor, causes the at least one processor to perform operations comprising:
storing a first hierarchy table in a database, the first hierarchy table comprising first hierarchy data that represents a snapshot state of a hierarchy tree of entities at a first point in time, the first hierarchy table having been last updated at the first point in time;
subsequent to the first point in time, receiving one or more user requests to change entity data stored in a data storage structure, the entity data stored in the data storage structure representing entities of the hierarchy tree;
storing one or more change events in a queue based on the receiving of the one or more user requests to change entity data, the one or more change events representing the one or more requested changes of entity data;
receiving a first query request for the hierarchy tree subsequent to the receiving of the one or more user requests to change entity data;
in response to the receiving of the first query request, retrieving the one or more change events stored in the queue and generating a first query result based on the first hierarchy table stored in the database and the retrieved one or more change events; and
performing a function of an enterprise application platform using the generated first query result.

20. The non-transitory machine-readable storage medium of claim 19, wherein the first hierarchy data comprises a result of a pre-order (NLR) traversal of the hierarchy tree.

* * * * *